(12) United States Patent
Huang

(10) Patent No.: US 8,607,087 B2
(45) Date of Patent: Dec. 10, 2013

(54) HOST DEVICE OF DUAL POWER SUPPLY

(75) Inventor: Tang-Hsien Huang, Taipei (TW)

(73) Assignee: Multi-Expander Technology Inc., New Taipei (TW)

(*) Notice: Subject to any disclaimer, the term of this patent is extended or adjusted under 35 U.S.C. 154(b) by 172 days.

(21) Appl. No.: 13/357,869

(22) Filed: Jan. 25, 2012

(65) Prior Publication Data

US 2013/0124878 A1 May 16, 2013

(30) Foreign Application Priority Data

Nov. 15, 2011 (TW) .............................. 100221553 U

(51) Int. Cl.
*G06F 1/26* (2006.01)
(52) U.S. Cl.
USPC .............................................. 713/330; 713/2
(58) Field of Classification Search
USPC ....................................................... 713/2, 330
See application file for complete search history.

(56) References Cited

U.S. PATENT DOCUMENTS

| 6,286,108 B1* | 9/2001 | Kamo et al. ................... 713/330 |
| 6,448,672 B1* | 9/2002 | Voegeli et al. ................. 307/52 |
| 2008/0072090 A1* | 3/2008 | O'Connor et al. ............ 713/330 |

* cited by examiner

*Primary Examiner* — Albert Wang
(74) *Attorney, Agent, or Firm* — Muncy, Geissler, Olds & Lowe, PLLC

(57) ABSTRACT

A host device of dual power supply includes a chassis, a motherboard disposed in the chassis, at least one storage unit electrically coupled to the motherboard, two power supplies electrically coupled to the motherboard and the storage unit for supplying power to the motherboard and the storage unit, and a control unit electrically coupled to the motherboard, the storage unit and the power supply. When a boot signal is received by the control unit, one of the power supplies provides a voltage required by the storage unit at the moment of booting and during operations that follow, and the other power supply is driven to provide a voltage required by the motherboard at the moment of booting and during operations that follow.

8 Claims, 3 Drawing Sheets

HOST DEVICE OF DUAL POWER SUPPLY

CROSS-REFERENCE TO RELATED APPLICATION

This application claims the benefit of Taiwan Patent Application No. 100221553, filed on Nov. 15, 2011, in the Taiwan Intellectual Property Office, the disclosure of which is incorporated herein in its entirety by reference.

BACKGROUND OF THE INVENTION

1. Field of the Invention

The present invention relates to a host device of dual power supply, in particular to the host device that supplies electric power to a motherboard and a hard disk through two separate power supplies when a main system is booted, so as to prevent outputting an overly high instantaneous voltage.

2. Description of the Related Art

As science and technology advance, a computer system with a high computing and processing efficiency becomes one of the necessary accessories of our daily life and work. The use of computers for dealing business matters, engineering calculations and other applications has become very popular.

In general, a computer system includes a motherboard for managing the system and computation functions, a hard disk for controlling data storage, and a power supply for supplying electric power. At the moment of booting up the computer system, the driving voltage required for the booting is the highest and most unstable. It is mainly because the power supply has to output power to the motherboard and the hard disk simultaneously during booting. It is one of the main reasons causing a malfunction of the power supply at the moment of booting due to the instantaneous fluctuated voltage. In addition, the power consumption of the system increases with the total driving voltage of the electrical loads in the system. Present systems generally have a higher voltage requirement in order to support the need for an increased number of different electronic components including the memory, processor, and hard disk. If only one power supply is used for supplying the voltage, then a high-voltage power supply is required. Most high-voltage power supplies are expensive and also incur a risk of overloads. Obviously, the practical applications of the aforementioned design require improvements. In view of the problems of the conventional power supply, the inventor of the present invention designed and developed a host device of dual power supply in hope of overcoming the drawbacks of the prior art and enhancing the industrial applications.

SUMMARY OF THE INVENTION

In view of the deficiencies of the prior art, it is a primary objective of the present invention to provide a host device of dual power supply to overcome the deficiencies of the prior art.

To achieve the aforementioned objective, the present invention provides a host device of dual power supply, comprising: a chassis, which is a casing having a partitioned accommodating space therein; a motherboard, which is a main circuit board disposed in the chassis; at least one storage unit, disposed in the chassis, and electrically coupled to the motherboard; two power supplies, disposed in the chassis, and electrically coupled to the motherboard and the storage unit, for supplying electric power to the motherboard and the storage unit; and a control unit, electrically coupled to the motherboard, the storage unit and the power supply. When a boot signal is received, one of the power supplies provides a voltage required for the storage unit at the moment of booting, and then further drives the other power supply to provide a voltage required for the motherboard at the moment of booting.

Preferably, the control unit may be disposed in the chassis.

Preferably, the storage unit may include at least one hard disk.

Preferably, the partitioned accommodating space may be divided into a motherboard disposition space, a storage device disposition space and a power supply disposition space.

Preferably, the motherboard is disposed in the motherboard disposition space of the chassis.

Preferably, the storage unit is disposed in the storage device disposition space the chassis.

Preferably, the power supply is disposed in the power supply disposition space of the chassis.

Preferably, the motherboard may include a processor, a memory, and a display processing circuit disposed thereon.

The design of the host device of dual power supply in accordance with the present invention makes use of a change of configuration to provide two power supplies with separate power supply functions. One of the power supplies is provided for supplying power to the storage unit at the moment of booting a host system, and then the other power supply is provided for supplying power to the motherboard. This tactic can avoid causing a burden of the power supply when the driving voltage during booting is overly high and then reduces the service life of the system. In addition, this design can replace the original high-voltage power supply by two general power supplies and achieve the effect of saving the equipment cost since the high-voltage power supply is much more expensive than two general power supplies. It also provides and outputs the required voltage to electronic components stably to enhance the stability of the overall system without worrying insufficient or unstable voltage of the system due to the disposition of too-many built-in electronic devices.

The aforementioned objective, technical characteristics and effects will become clear with the detailed description of preferred embodiments accompanied with the illustration of related drawings as follows.

DETAILED DESCRIPTION OF THE PREFERRED EMBODIMENTS

The aforementioned and other technical contents of the present invention will be described by means of a preferred embodiment together with related drawings as follows, and the drawings are provided for the purpose of illustrating the invention and supplementing the specification, but they are not necessary drawn in actual scale or precision. The drawings are provided for reference only, but not intended for limiting the scope of the invention.

Figure 1:
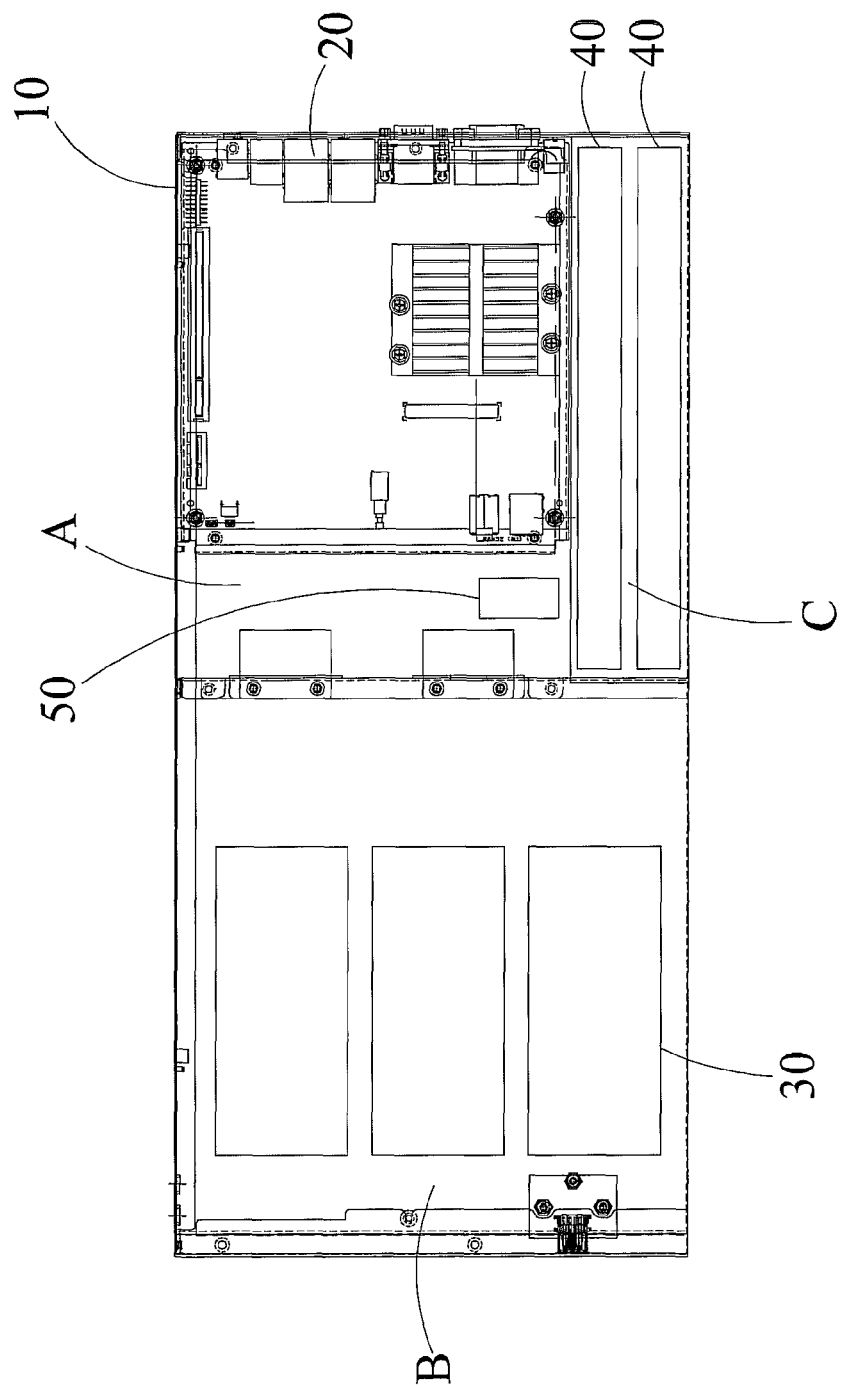
FIG. 1 is a schematic view of disposing a host device of dual power supply in accordance with the present invention.

With reference to FIG. 1 for a schematic view of disposing a host device of dual power supply in accordance with the present invention. The host device of dual power supply comprises a chassis (10), a motherboard (20), at least one storage unit (30), two power supplies (40) and a control unit (50).

The chassis (10) is a casing which has a partitioned accommodating space enclosed therein, and the partitioned accommodating space can be divided into a motherboard disposition space (A), a storage device disposition space (B) and a power supply disposition space (C).

The motherboard (20) is a main circuit board which has a processor, a memory and a display processing circuit. The motherboard (20) is disposed in the motherboard disposition space (A) of the chassis (10).

The storage unit (30) comprises a plurality of hard disks disposed in the storage device disposition space (B) of the chassis (10) and electrically coupled to the motherboard (20).

The power supply (40) is disposed in the power supply disposition space (C) of the chassis (10), and electrically coupled to the motherboard (20) and the storage unit (30) for supplying electric power required by the operation of the motherboard (20) and the storage unit (30).

Figure 2:
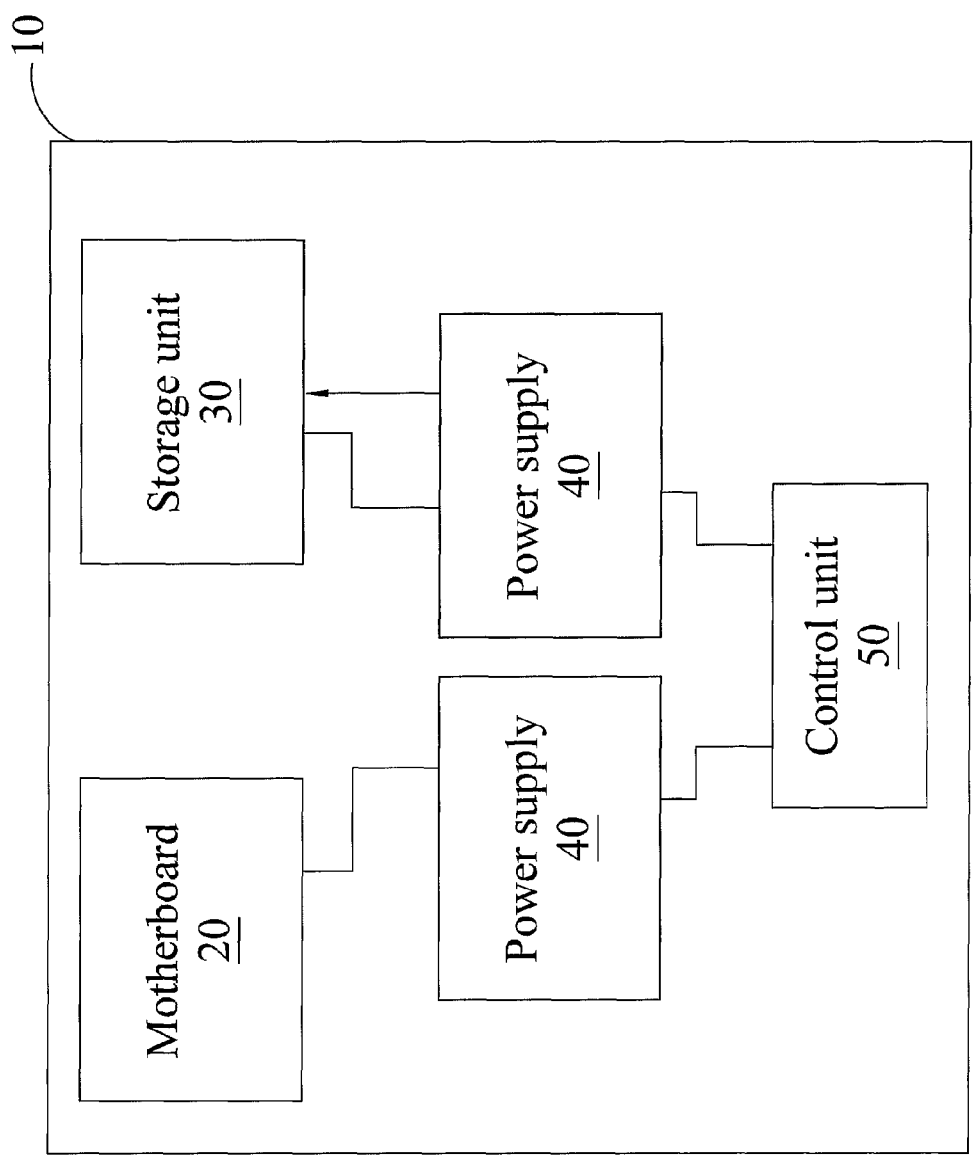
FIG. 2 is a first schematic view of continuous movements of a host device of dual power supply in accordance with the present invention.
Figure 3:
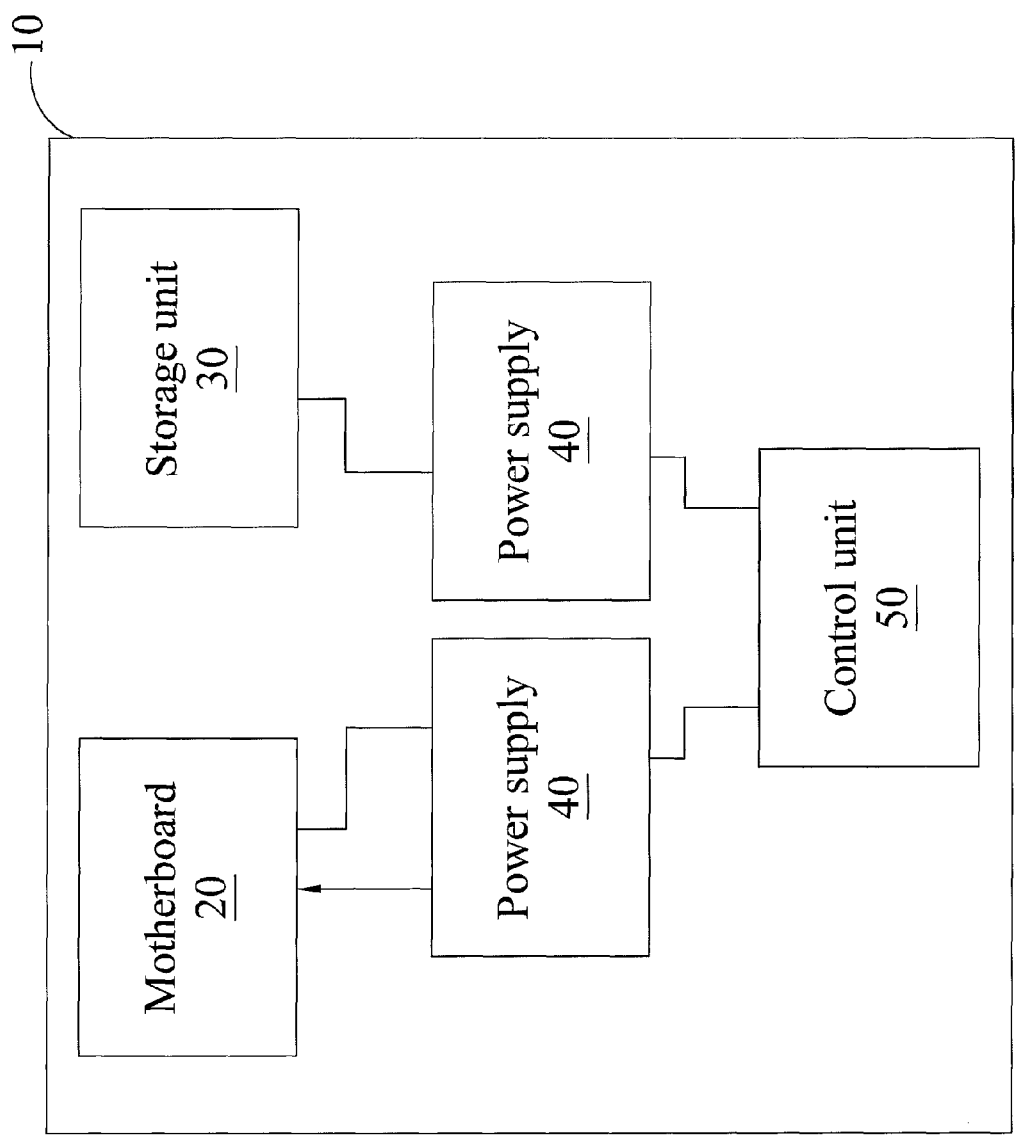
FIG. 3 is a second schematic view of continuous movements of a host device of dual power supply in accordance with the present invention.

With reference to FIGS. 2 and 3, the control unit (50) can be disposed in the chassis (10) and electrically coupled to the motherboard (20), the storage unit (30) and the power supply (40). While the control unit (50) receiving a boot signal, the control unit (50) drives one of the power supplies (40) to supply a voltage which is required by the storage unit (30) at the moment of booting and further supply electric power for operations that follow. Then, the control unit (50) drives the other power supply (40) to supply a voltage which is required by the motherboard (20) at the moment of booting and further supply electric power for operations that follow.

With the skillful design of the host device of dual power supply of the present invention, and the change of configuration, the power supplies (40) with the separate power supply function could use one of the power supplies to supply electric power to the storage unit (30) at the moment of booting the host system, and the other power supply (40) to supply electric power to the motherboard (20).

This measure could avoid causing a burden in the power supply (40) when the driving voltage during booting is overly high results in reducing the service life of the system. In addition, this design could replace the original high-voltage power supply by two general power supplies (40) and achieve the effect of saving the equipment cost since the high-voltage power supply is much more expensive than two general power supplies (40). This design also provides and outputs the required voltage to electronic components more stably to enhance the stability of the overall system without worrying insufficient or unstable voltage of the system due to the disposition of too-many built-in electronic devices.

While the invention has been described by means of specific embodiments, numerous modifications and variations could be made thereto by those skilled in the art without departing from the scope and spirit of the invention set forth in the claims.

What is claimed is:

1. A host device of dual power supply, comprising:
   a chassis, being a casing having a partitioned accommodating space therein;
   a motherboard, being a main circuit board disposed in the chassis;
   at least one storage unit, disposed in the chassis, and electrically coupled to the motherboard;
   two power supplies, disposed in the chassis, and electrically coupled to the motherboard and the storage unit, for supplying electric power to the motherboard and the storage unit; and
   a control unit, electrically coupled to the motherboard, the storage unit and the power supply, when a boot signal is received by the control unit, one of the power supplies provides a voltage required for the storage unit at the moment of booting, and the control unit further drives the other power supply to provide a voltage required for the motherboard at the moment of booting.

2. The host device of dual power supply of claim 1, wherein the control unit is disposed in the chassis.

3. The host device of dual power supply of claim 1, wherein the storage unit comprises at least one hard disk.

4. The host device of dual power supply of claim 1, wherein the partitioned accommodating space is divided into a motherboard disposition space, a storage device disposition space and a power supply disposition space.

5. The host device of dual power supply of claim 4, wherein the motherboard is disposed in the motherboard disposition space of the chassis.

6. The host device of dual power supply of claim 4, wherein the storage unit is disposed in the storage device disposition space of the chassis.

7. The host device of dual power supply of claim 4, wherein the power supply is disposed in the power supply disposition space of the chassis.

8. The host device of dual power supply of claim 1, wherein the motherboard has a processor, a memory, and a display processing circuit disposed thereon.

\* \* \* \* \*